US008424301B2

(12) United States Patent
Choi et al.

(10) Patent No.: US 8,424,301 B2

(45) Date of Patent: Apr. 23, 2013

(54) HYDRAULIC FLOW SHARING SYSTEM FOR EXCAVATING AND PIPE LAYING WORK

(75) Inventors: Han Ok Choi, Masan-si (KR); Kyung Sub Lee, Changwon-si (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 906 days.

(21) Appl. No.: 12/536,264

(22) Filed: Aug. 5, 2009

(65) Prior Publication Data

US 2010/0031648 A1 Feb. 11, 2010

(30) Foreign Application Priority Data

Aug. 8, 2008 (KR) ........................ 10-2008-0077746

(51) Int. Cl.
*F16D 31/02* (2006.01)

(52) U.S. Cl.
USPC ........................................................... 60/421

(58) Field of Classification Search .................... 60/420, 60/421
See application file for complete search history.

(56) References Cited

U.S. PATENT DOCUMENTS

| | | | | |
|---|---|---|---|---|
| 4,779,416 | A * | 10/1988 | Chatterjea et al. | 60/429 |
| 7,614,225 | B2 * | 11/2009 | Kim | 60/421 |
| 7,634,909 | B1 * | 12/2009 | Chatterjea | 60/338 |
| 8,146,355 | B2 * | 4/2012 | Lee | 60/421 |
| 2007/0283688 | A1 * | 12/2007 | Vigholm et al. | 60/327 |

* cited by examiner

*Primary Examiner* — Edward Look
*Assistant Examiner* — Logan Kraft
(74) *Attorney, Agent, or Firm* — Ladas & Parry LLP

(57) ABSTRACT

A hydraulic flow sharing system for excavating and pipe laying work is provided, which can prevent the abrupt change of a traveling speed during traveling through compulsory sharing of the flow rate applied to a working device and a traveling apparatus when a combined operation, in which the traveling apparatus and the working device such as a boom are simultaneously driven, is performed.

7 Claims, 2 Drawing Sheets

HYDRAULIC FLOW SHARING SYSTEM FOR EXCAVATING AND PIPE LAYING WORK

CROSS-REFERENCE TO RELATED APPLICATION

This application is based on and claims priority from Korean Patent Application No. 10-2008-0077746, filed on Aug. 8, 2008 in the Korean Intellectual Property Office, the disclosure of which is incorporated herein in its entirety by reference.

FIELD OF THE INVENTION

The present invention relates to a hydraulic flow sharing system for excavating and pipe laying work, which can prevent an abrupt change of a traveling speed of a traveling apparatus when a pipe laying work for pulling up and carrying a heavy oil pipe is performed through replacement of working devices (e.g. a boom, a winch, and the like).

More particularly, the present invention relates to a hydraulic flow sharing system for excavating and pipe laying work, which can prevent the occurrence of an abrupt change of a traveling speed during traveling through compulsory sharing of the flow rate being applied to a working device or a traveling apparatus when a combined operation, in which the traveling apparatus and the working device, such as a boom for pulling up an oil pipe, are simultaneously driven, is performed.

BACKGROUND OF THE INVENTION

Generally, in the case of laying heavyweight oil pipes, water pipes, and the like, under the ground, a dedicated pipe layer is used to carry the pipes to a place where the pipes are to be laid under the ground. In this case, the pipe layer can perform the basic operation (e.g. traveling, swing, and the like) of an excavator, and working devices (e.g. a boom, an arm, a bucket, and the like) are replaced by a boom, a winch, and the like.

The pipe layer may move to a place where oil pipes are to be laid under the ground or perform a swing operation in a state where a heavyweight oil pipe is pulled up using a flexible wire rope. In the case where the pipe layer travels or performs a swing operation at high speed or the traveling speed is abruptly increased or decreased, fatal problems may occur on the pipe layer.

Generally, according to the basic construction of a hydraulic circuit of an excavator, one of two hydraulic pumps drives left and right traveling motors, and the other thereof drives working devices such as a boom, an arm, and the like. In the case of driving the working device in a state where a traveling operation is performed, declination of the equipment may occur due to an unbalanced state of hydraulic fluid being supplied to the respective traveling motors.

Accordingly, in the case of driving the working device during traveling, a straight traveling valve is used to prevent the declination. That is, in the case where the traveling apparatus and the working device are simultaneously manipulated, one of the two hydraulic pumps takes complete charge of the hydraulic fluid being supplied to the left traveling motor and the right traveling motor through shifting of the straight traveling valve, and thus the declination of the equipment can be prevented.

In the case where only one of the working device and the traveling apparatus is driven in the shifting mode of the straight traveling valve (i.e. in the case where a combined work mode is released), the amount of hydraulic fluid being supplied to the traveling apparatus is changed, depending on the manipulation state of the working device, to cause an abrupt change of the traveling speed (i.e. increase or decrease of the traveling speed).

On the other hand, in the case of the excavator, a safety accident such as in the pipe layer may not occur due to the structural characteristic of the working devices, such as a boom, an arm, and the like, composed of rigid members even if the traveling speed is abruptly changed during traveling.

However, if the traveling speed is abruptly changed during traveling in a state where the pipe layer pulls up the oil pipe, the oil pipe shakes in a traveling direction of the equipment due to inertia, and severe safety accident may occur. In this case, the oil may collide with a part of the equipment neighboring the oil pipe or may secede from a wire rope and fall down.

SUMMARY OF THE INVENTION

Accordingly, the present invention has been made to solve the above-mentioned problems occurring in the prior art while advantages achieved by the prior art are maintained intact.

Embodiments of the present invention relate to a hydraulic flow sharing system for excavating and pipe laying work, which can prevent the occurrence of an abrupt change of a traveling speed during traveling and thus can prevent the shaking of a pulled object due to inertia through compulsory sharing of the flow rate being applied to a working device or a traveling apparatus when a combined operation, in which the traveling apparatus and the working device, such as a boom for pulling up an oil pipe, are simultaneously driven, is performed.

Embodiments of the present invention relate to a hydraulic flow sharing system for excavating and pipe laying work, which can improve the work efficiency through heightening of a traveling speed when an excavating work is performed, and which can prevent the damage of an oil pipe that shakes due to inertia and the occurrence of safety accidents through prevention of an abrupt change of the traveling speed when a pipe laying work is performed.

In one aspect of the present invention, there is provided a hydraulic flow sharing system for excavating and pipe laying work, which includes first and second variable displacement hydraulic pumps and a pilot pump connected to an engine; a left traveling motor and a boom cylinder connected to the first hydraulic pump; control valves installed in a center bypass path of the first hydraulic pump, and shifted to control the flow direction and flow amount of hydraulic fluid being supplied to the left traveling motor and the boom cylinder; a right traveling motor, a swing motor, and a winch motor connected to the second hydraulic pump; control valves installed in a center bypass path of the second hydraulic pump, and shifted to control the flow direction and flow amount of hydraulic fluid being supplied to the right traveling motor, the swing motor, and the winch motor; a straight traveling valve installed on an upstream side of the center bypass path of the first hydraulic pump, and shifted, in response to a signal pressure applied from an outside when a work mode for simultaneously driving the boom cylinder, the swing motor, the winch motor, and the left and right traveling motors is selected, to share and supply the hydraulic fluid fed from the first hydraulic pump to the control valves for the boom cylinder, the swing motor, and the winch motor, and to share and supply the hydraulic fluid fed from the second hydraulic pump to the control valves for the left and right traveling motors, respectively; an unloading valve open, in response to the signal pressure for shifting the straight traveling valve, to prevent the occurrence of overload in the center bypass paths of the first and second hydraulic pumps; and a selection valve releasing an unloading function of the corresponding unloading valve when any one of the boom cylinder, the swing motor, the winch motor, and the left and right traveling motors is driven in a shift mode of the straight traveling valve.

The hydraulic flow sharing system according to a preferred embodiment of the present invention may further include a solenoid valve shifted, in response to an electric signal input from an outside when the work mode for simultaneously driving the boom cylinder, the swing motor, the winch motor, and the left and right traveling motors is selected, to apply the pilot signal pressure from the pilot pump to the straight traveling valve and the selection valve, respectively.

The hydraulic flow sharing system according to a preferred embodiment of the present invention may further include a pilot control valve outputting the pilot signal pressure to the control valves so as to drive the boom cylinder, the swing motor, and the winch motor; and a traveling pedal outputting the pilot signal pressure to the control valves for a traveling apparatus so as to drive the left and right traveling motors.

The hydraulic flow sharing system according to a preferred embodiment of the present invention may further include a shuttle valve for the working device outputting manipulation signals of the boom cylinder, the swing motor, and the winch motor to the selection valve in accordance with manipulation of the pilot control valve; and a shuttle valve for the traveling apparatus outputting a manipulation signal of the traveling apparatus to the selection valve in accordance with manipulation of the traveling pedal.

In a shifting mode of the straight traveling valve, the unloading valve may be opened by pilot signal pressure for shifting the straight traveling valve, and inclination angles of swash plates of the first and second hydraulic pumps may be changed to their minimum state.

The hydraulic flow sharing system according to a preferred embodiment of the present invention may further include a first shuttle valve controlling the inclination angle of the swash plate of the second hydraulic pump in accordance with the pressure selected between the pilot signal pressure being applied to the selection valve and the pressure on a downstream side of the center bypass path of the second hydraulic pump; and a second shuttle valve controlling the inclination angle of the swash plate of the first hydraulic pump in accordance with the pressure selected between the pilot signal pressure being applied to the selection valve and the pressure on a downstream side of the center bypass path of the first hydraulic pump.

With the above-described construction, the hydraulic flow sharing system for excavating and pipe laying work according to the embodiments of the present invention has the following advantages.

The shaking of a pulled object due to inertia can be prevented through prevention of an abrupt change of a traveling speed during traveling when a combined operation, in which a traveling apparatus and a working device are simultaneously driven, is performed, and thus operator's convenience in traveling manipulation can be improved.

Also, the work efficiency can be improved through heightening of a traveling speed when an excavating work is performed, and the damage of an oil pipe that shakes due to inertia and the occurrence of safety accidents can be prevented through prevention of an abrupt change of the traveling speed when a pipe laying work is performed.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. The matters defined in the description, such as the detailed construction and elements, are nothing but specific details provided to assist those of ordinary skill in the art in a comprehensive understanding of the invention, and thus the present invention is not limited thereto.

Figure 1:
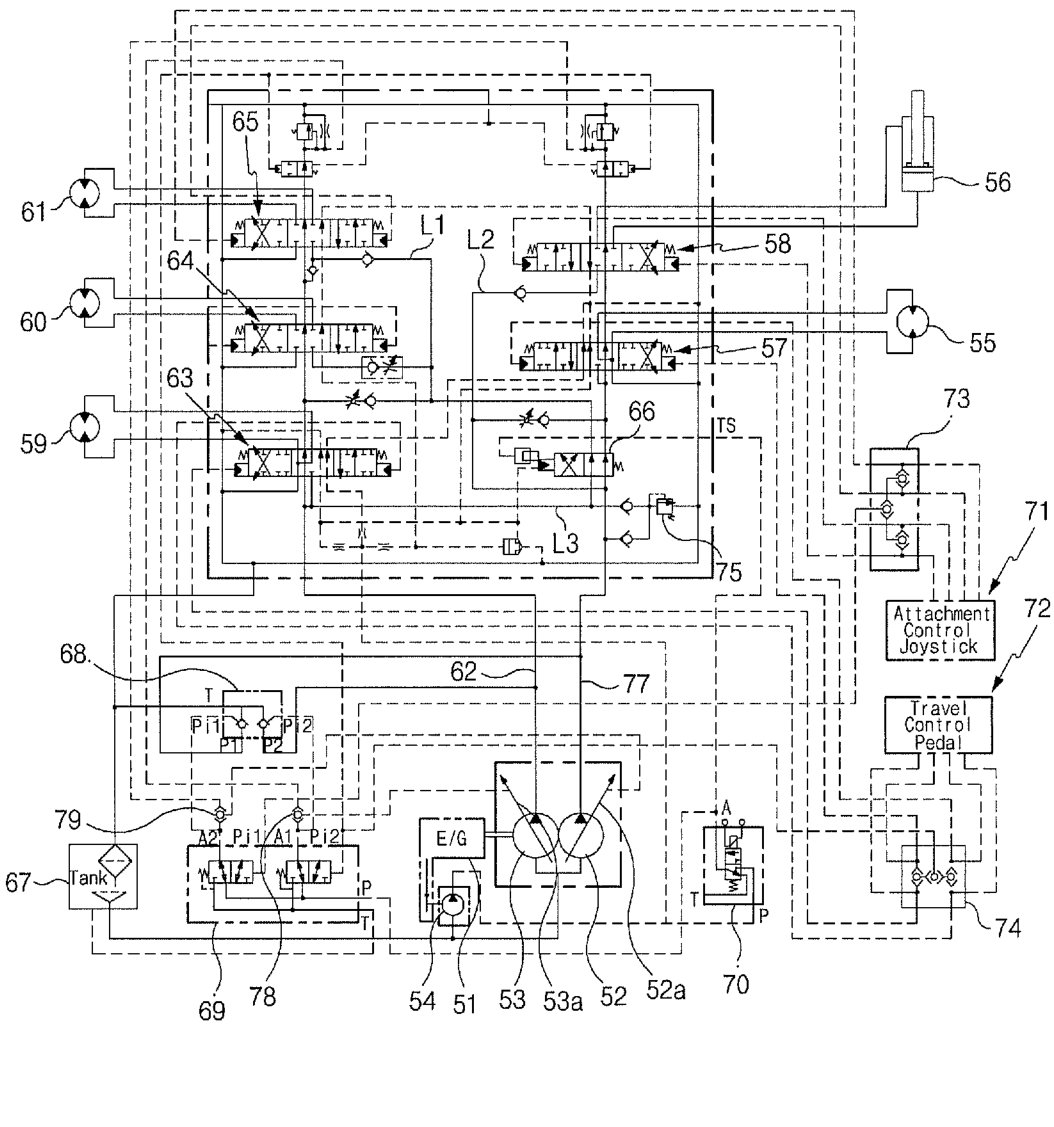
FIG. 1 is a hydraulic circuit diagram of a hydraulic flow sharing system for excavating and pipe laying work according to an embodiment of the present invention.
Figure 2:
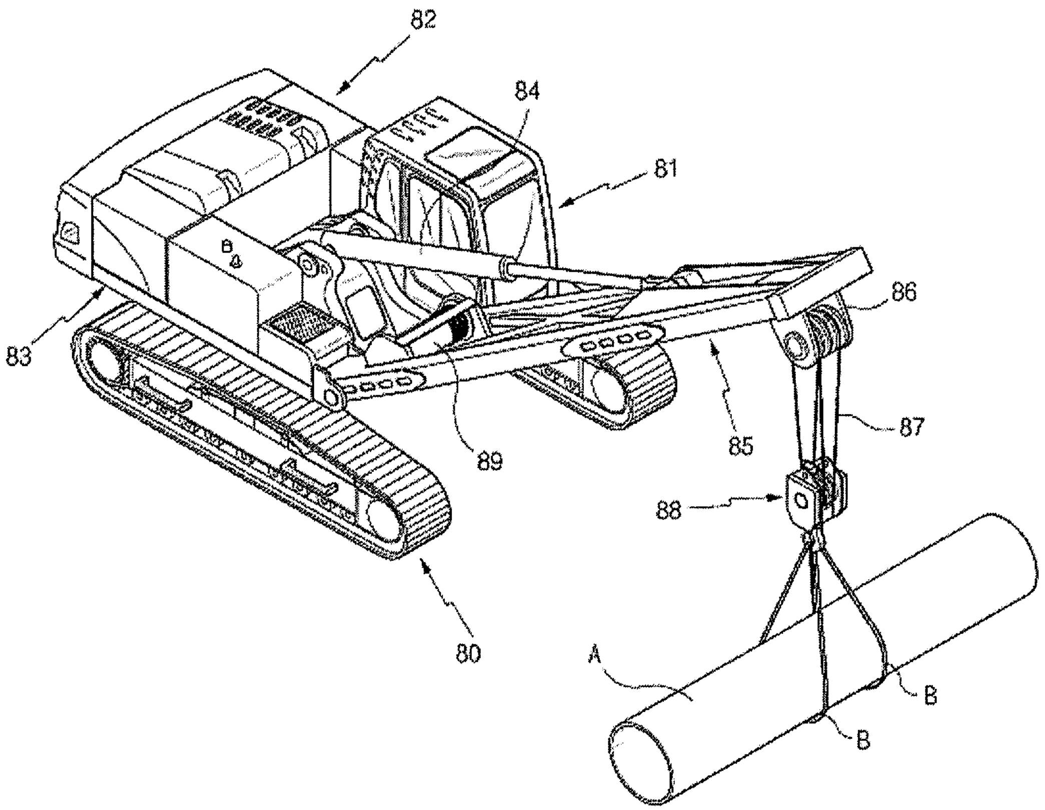
FIG. 2 is a perspective view of a pipe layer to which a hydraulic flow sharing system for excavating and pipe laying work according to an embodiment of the present invention is applied.

As illustrated in FIGS. 1 and 2, a hydraulic flow sharing system for excavating and pipe laying work according to an embodiment of the present invention includes first and second variable displacement hydraulic pumps 52 and 53 and a pilot pump 54 connected to an engine 51; a left traveling motor 55 and a boom cylinder 56 connected to the first hydraulic pump 52; control valves 57 and 58 installed in a center bypass path 77 of the first hydraulic pump 52, and shifted to control the flow direction and flow amount of hydraulic fluid being supplied to the left traveling motor 55 and the boom cylinder 56; a right traveling motor 59, a swing motor 60, and a winch motor 61 connected to the second hydraulic pump 53; control valves 63, 64, and 65 installed in a center bypass path 62 of the second hydraulic pump 53, and shifted to control the flow direction and flow amount of hydraulic fluid being supplied to the right traveling motor 59, the swing motor 60, and the winch motor 61; a straight traveling valve 66 installed on an upstream side of the center bypass path 77 of the first hydraulic pump 52, and shifted, in response to a pilot signal pressure from the pilot pump 54 when a work mode for simultaneously driving the boom cylinder 56, the swing motor 60, the winch motor 61, and the left and right traveling motors 55 and 59 is selected, to share and supply the hydraulic fluid fed from the first hydraulic pump 52 to the control valve 58 for the boom cylinder, and the control valves 64 and 65 for the swing motor and the winch motor, and to share and supply the hydraulic fluid fed from the second hydraulic pump 53 to the control valves 57 and 63 for the left and right traveling motors, respectively; an unloading valve 68 open, in response to the signal pressure for shifting the straight traveling valve 66, to make the hydraulic fluid, which corresponds to overload occurring in the closed center bypass paths 77 and 62 of the first and second hydraulic pumps 52 and 53 in accordance with the shifting of the straight traveling valve 66, return to a hydraulic tank 67; and a selection valve 69 releasing an unloading function of the corresponding unloading valve when any one of the boom cylinder 56, the swing motor 60, the winch motor 61, and the left and right traveling motors 55 and 59 is driven in a shift mode of the straight traveling valve 66.

The hydraulic flow sharing system according to a preferred embodiment of the present invention further includes a solenoid valve 70 shifted, in response to an electric signal input from an outside when the work mode for simultaneously driving the boom cylinder 56, the swing motor 60, the winch motor 61, and the left and right traveling motors 55 and 59 is selected, to apply the pilot signal pressure from the pilot pump 54 to the straight traveling valve 66 and the selection valve 69, respectively.

The hydraulic flow sharing system according to a preferred embodiment of the present invention further includes a pilot control valve (RCV) 71 outputting the pilot signal pressure to the control valves 58, 64, and 65 so as to drive the boom cylinder 56, the swing motor 60, and the winch motor 61; and a traveling pedal 72 outputting the pilot signal pressure to the control valves 57 and 63 for a traveling apparatus so as to drive the left and right traveling motors 55 and 59.

The hydraulic flow sharing system according to a preferred embodiment of the present invention further includes a shuttle valve 73 for the working device outputting manipulation signals of the boom cylinder 56, the swing motor 60, and the winch motor 61 to the selection valve 69 in accordance with manipulation of the pilot control valve 71; and a shuttle valve 74 for the traveling apparatus outputting a manipulation signal of the traveling apparatus to the selection valve 69 in accordance with manipulation of the traveling pedal 72.

In a shifting mode of the straight traveling valve 66, the unloading valve 68 is opened by pilot signal pressure Pi1 and Pi2 for shifting the straight traveling valve 66, and inclination angles of swash plates 52*a* and 53*a* of the first and second hydraulic pumps 52 and 53 are changed to their minimum state.

The hydraulic flow sharing system according to a preferred embodiment of the present invention further includes a first shuttle valve 78 controlling the inclination angle of the swash plate 53*a* of the second hydraulic pump 53 in accordance with the pressure selected between the pilot signal pressure Pi2 being applied to the selection valve 69 and the pressure on a downstream side of the center bypass path 62 of the second hydraulic pump 53; and a second shuttle valve 79 controlling the inclination angle of the swash plate 52*a* of the first hydraulic pump 52 in accordance with the pressure selected between the pilot signal pressure Pi1 being applied to the selection valve 69 and the pressure on a downstream side of the center bypass path 77 of the first hydraulic pump 52.

As illustrated in FIG. 2, a pipe layer, to which the hydraulic flow sharing system for excavating and pipe laying work according to an embodiment of the present invention is applied, includes a lower driving structure 80; an upper frame 83 mounted to swivel on a lower driving structure 80, and provided with a cab 81 and an engine room 82 mounted thereon; a boom 85 having a lower end part rotatably fixed to the upper frame 83, and rotated by the driving of the boom cylinder 84; a hook 88 ascending/descending by a wire rope 87 that is supported on a sheave 86 fixed to an upper part of the boom 85; and a winch 89 making the hook 88 ascend/descend through the wire rope 87 wound thereon in accordance with the driving direction of the winch motor (not illustrated).

Hereinafter, the operation of the hydraulic flow sharing system for excavating and pipe laying work according to an embodiment of the present invention will be described in detail with reference to the accompanying drawings.

As illustrated in FIGS. 1 and 2, if the control valves 58 and 65 for supplying the pilot signal pressure are shifted through manipulation of the pilot control valve 71, the boom cylinder 56 and the winch motor 61 are driven to pull up an oil pipe A, and then if the control valves 57 and 63 for supplying the pilot signal pressure are shifted through manipulation of the traveling pedal 72, the left traveling motor 55 and the right traveling motor 59 are driven to make the oil pipe A move to a place where the pipe is to be laid under the ground.

Specifically, if a pipe laying mode is selected through manipulation of a work mode selection switch (not illustrated), an electric signal is supplied to the solenoid valve 70, and a spool is shifted in a downward direction as shown in the drawing. Accordingly, the pilot signal pressure, which is discharged from the pilot pump 54 and passes through the solenoid valve 70, is applied to the straight traveling valve 66 to shift the spool in the right direction as shown in the drawing.

Accordingly, a part of the hydraulic fluid being discharged from the first hydraulic pump 52 is supplied to the control valves 64 and 65 through the center bypass path 77, the straight traveling valve 66, and a flow path L1 in order, and thus the swing motor 60 and the winch motor 61 are driven. Simultaneously, a part of the hydraulic fluid fed from the first hydraulic pump 52 is supplied to the control valve 58 through the center bypass path 77 and a flow path L2, and thus the boom cylinder 56 is driven.

By contrast, a part of the hydraulic fluid being discharged from the second hydraulic pump 53 is supplied to the control valve 63 through the center bypass path 62, and thus the right traveling motor 59 is driven. Simultaneously, a part of the hydraulic fluid fed from the second hydraulic pump 53 is supplied to the control valve 57 through the center bypass path 62, a flow path L3, and the straight traveling valve 66 in order, and thus the left traveling motor 55 is driven.

That is, in the case of traveling in a state where the oil pipe A is pulled up, the straight traveling valve 66 is shifted by the pilot signal pressure being applied in accordance with the manipulation of the work mode selection switch. Accordingly, the hydraulic fluid discharged from the first hydraulic pump 52 is shared and supplied to the boom cylinder 56, the swing motor 60, and the winch motor 61, and the hydraulic fluid discharged from the second hydraulic pump 53 is shared and supplied to the left and right traveling motors 55 and 59.

In the case of traveling after the oil pipe A is pulled up, the hydraulic fluid discharged from the first and second hydraulic pumps 52 and 53 is independently supplied to the left and right traveling motors 55 and 59, the boom cylinder 56, the swing motor 60, and the winch motor 61 to drive them. Accordingly, in the case of simultaneously driving the boom cylinder 56, the swing motor 60, the winch motor 61, and the left and right traveling motors 55 and 59, the abrupt change of the traveling speed, which is caused by a difference in load pressure between the boom cylinder 56, the swing motor 60, the winch motor 61, and the left and right traveling motors 55 and 59, can be prevented.

That is, in the case of traveling after the oil pipe A is pulled up, the shaking of the oil pipe A due to inertia can be prevented through reduction of an abrupt change of the traveling speed.

On the other hand, overload occurs due to high-voltage generation in the closed center bypass paths 62 and 77 of the first and second hydraulic pumps 52 and 53 in accordance with the shifting of the straight traveling valve 66. In this case, by opening the unloading valve 68 by the pilot signal pressure Pi1 and Pi2 for shifting the straight traveling valve 66, the hydraulic fluid that corresponds to the overload pressure of the center bypass paths 62 and 77 is returned to the hydraulic tank 67 to prevent the occurrence of the overload.

In this case, by the pilot signal pressure for shifting the straight traveling valve 66, the inclination angles of the swash plates 52*a* and 53*a* of the first and second hydraulic pumps 52 and 53 are changed to their minimum state, and thus the discharge flow rate is minimized.

On the other hand, the independent manipulation of the traveling apparatus or the working device in a state where the straight traveling valve 66 is shifted will now be described.

In the case of manipulating the pilot control valve 71, the spool of the selection valve 69 (illustrated on the right side in the drawing) is shifted in the left direction as shown in the drawing by the pilot signal pressure for manipulating the working device, which passes through the shuttle valve 73 for the working device.

Due to this, the supply of the pilot signal pressure Pi1 and Pi2 to the unloading valve 68, among the pilot signal pressure discharged from the pilot pump 54 to shift the straight traveling valve 66, is intercepted, and thus the unloading function of the corresponding unloading valve 68 is stopped.

Accordingly, an operating pressure is formed in the center bypass path 77 of the first hydraulic pump 52 or the center bypass path 62 of the second hydraulic pump 53 to operate the traveling apparatus or the working device.

In this case, the straight traveling valve 66 is kept in the shifting mode by the pilot signal pressure being applied through the solenoid valve 70, and thus in the case of traveling after the oil pipe A is pulled up, the traveling speed of the traveling apparatus can be kept constant regardless of the manipulation of the working device.

As described above, according to the flow sharing system for excavating and pipe laying work according to the embodiments of the present invention, the supply of the hydraulic fluid, which is supplied to the working device side, to the traveling apparatus is intercepted when the excavator travels in a state where a heavyweight oil pipe is pulled up using a working device such as a boom. Accordingly, the abrupt change of the traveling speed is prevented from occurring, and thus the shaking of the pulled object due to inertia can be prevented.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A hydraulic flow sharing system for excavating and pipe laying work, comprising:

first and second variable displacement hydraulic pumps and a pilot pump coupled to an engine;

a left traveling motor and a boom cylinder coupled to the first hydraulic pump;

control valves installed in a center bypass path of the first hydraulic pump, and shifted to control the flow direction and flow amount of hydraulic fluid being supplied to the left traveling motor and the boom cylinder;

a right traveling motor, a swing motor, and a winch motor coupled to the second hydraulic pump;

control valves installed in a center bypass path of the second hydraulic pump, and shifted to control the flow direction and flow amount of hydraulic fluid being supplied to the right traveling motor, the swing motor, and the winch motor;

a straight traveling valve installed on an upstream side of the center bypass path of the first hydraulic pump, and shifted, in response to a signal pressure applied from an outside when a work mode for simultaneously driving the boom cylinder, the swing motor, the winch motor, and the left and right traveling motors is selected, to share and supply the hydraulic fluid fed from the first hydraulic pump to the control valve for the boom cylinder and the control valves for the swing motor and the winch motor, and to share and supply the hydraulic fluid fed from the second hydraulic pump to the control valves for the left and right traveling motors, respectively;

an unloading valve open, in response to the signal pressure for shifting the straight traveling valve, to prevent the occurrence of overload in the center bypass paths of the first and second hydraulic pumps;

a selection valve releasing an unloading function of the corresponding unloading valve when any one of the boom cylinder, the swing motor, the winch motor, and the left and right traveling motors is driven in a shift mode of the straight traveling valve;

a first shuttle valve controlling an inclination angle of a swash plate of the second hydraulic pump in accordance with the pressure selected between the pilot signal pressure being applied to the selection valve and the pressure on a downstream side of the center bypass path of the second hydraulic pump; and a second shuttle valve controlling an inclination angle of a swash plate of the first hydraulic pump in accordance with the pressure selected between the pilot signal pressure being applied to the selection valve and the pressure on a downstream side of the center bypass path of the first hydraulic pump.

2. The hydraulic flow sharing system of claim 1, further comprising a solenoid valve shifted, in response to an electric signal input from an outside when the work mode for simultaneously driving the boom cylinder, the swing motor, the winch motor, and the left and right traveling motors is selected, to apply the pilot signal pressure from the pilot pump to the straight traveling valve and the selection valve, respectively.

3. The hydraulic flow sharing system of claim 2, further comprising:

a pilot control valve outputting the pilot signal pressure to the control valves so as to drive the boom cylinder, the swing motor, and the winch motor; and a traveling pedal outputting the pilot signal pressure to the control valves for a traveling apparatus so as to drive the left and right traveling motors.

4. The hydraulic flow sharing system of claim 3, further comprising:

a shuttle valve for the working device outputting manipulation signals of the boom cylinder, the swing motor, and the winch motor to the selection valve in accordance with manipulation of the pilot control valve; and a shuttle valve for the traveling apparatus outputting a manipulation signal of the traveling apparatus to the selection valve in accordance with manipulation of the traveling pedal.

5. The hydraulic flow sharing system of claim 1, wherein, in a shifting mode of the straight traveling valve, the unloading valve is opened by pilot signal pressure for shifting the straight traveling valve, and inclination angles of swash plates of the first and second hydraulic pumps are change to their minimum state.

6. The hydraulic flow sharing system of claim 2, wherein, in a shifting mode of the straight traveling valve, the unloading valve is opened by pilot signal pressure for shifting he straight traveling valve, and inclination angles of swash plates of the first and second hydraulic pumps are change to their minimum state.

7. A hydraulic flow sharing system for excavating and pipe laying work, comprising:

first and second variable displacement hydraulic pumps and a pilot pump coupled to an engine;

a left traveling motor and a boom cylinder coupled to the first hydraulic pump;

control valves installed in a center bypass path of the first hydraulic pump, and shifted to control the flow direction and flow amount of hydraulic fluid being supplied to the left traveling motor and the boom cylinder;

a right traveling motor, a swing motor, and a winch motor coupled to the second hydraulic pump;

control valves installed in a center bypass path of the second hydraulic pump, and shifted to control the flow direction and flow amount of hydraulic fluid being supplied to the right traveling motor, the swing motor, and the winch motor;

a straight traveling valve installed on an upstream side of the center bypass path of the first hydraulic pump, and shifted, in response to a signal pressure applied from an outside when a work mode for simultaneously driving the boom cylinder, the swing motor, the winch motor, and the left and right traveling motors is selected, to share and supply the hydraulic fluid fed from the first hydraulic pump to the control valve for the boom cylinder and the control valves for the swing motor and the winch motor, and to share and supply the hydraulic fluid fed from the second hydraulic pump to the control valves for the left and right traveling motors, respectively;

an unloading valve open, in response to the signal pressure for shifting the straight traveling valve, to prevent the occurrence of overload in the center bypass paths of the first and second hydraulic pumps; and a selection valve releasing an unloading function of the corresponding unloading valve when any one of the boom cylinder, the swing motor, the winch motor, and the left and right traveling motors is driven in a shift mode of the straight traveling valve, and further comprising a solenoid valve shifted, in response to an electric signal input from an outside when the work mode for simultaneously driving the boom cylinder, the swing motor, the winch motor, and the left and right traveling motors is selected, to apply the pilot signal pressure from the pilot pump to the straight traveling valve and the selection valve, respectively, and further comprising:

a pilot control valve outputting the pilot signal pressure to the control valves so as to drive the boom cylinder, the swing motor, and the winch motor; and a traveling pedal outputting the pilot signal pressure to the control valves for a traveling apparatus so as to drive the left and right traveling motors, and further comprising:

a shuttle valve for the working device outputting manipulation signals of the boom cylinder, the swing motor, and the winch motor to the selection valve in accordance with manipulation of the pilot control valve; and a shuttle valve for the traveling apparatus outputting a manipulation signal of the traveling apparatus to the selection valve in accordance with manipulation of the traveling pedal.

* * * * *